(12) United States Patent
Dussud

(10) Patent No.: US 10,126,174 B2
(45) Date of Patent: Nov. 13, 2018

(54) OPTICAL PYROMETER

(71) Applicant: VESUVIUS GROUP, SA, Ghlin (BE)

(72) Inventor: Michel Dussud, Saint-Martin-en-Haut (FR)

(73) Assignee: VESUVIUS GROUP, S.A., Ghlin (BE)

( * ) Notice: Subject to any disclaimer, the term of this patent is extended or adjusted under 35 U.S.C. 154(b) by 222 days.

(21) Appl. No.: 15/109,361

(22) PCT Filed: Jan. 5, 2015

(86) PCT No.: PCT/EP2015/050057
§ 371 (c)(1),
(2) Date: Jun. 30, 2016

(87) PCT Pub. No.: WO2015/104241
PCT Pub. Date: Jul. 16, 2015

(65) Prior Publication Data
US 2016/0327434 A1    Nov. 10, 2016

(30) Foreign Application Priority Data

Jan. 8, 2014    (EP) ..................................... 14150465

(51) Int. Cl.
*G01J 5/00* (2006.01)
*G01J 5/08* (2006.01)
*B22D 2/00* (2006.01)
*B22D 41/18* (2006.01)
*F27D 21/00* (2006.01)
(Continued)

(52) U.S. Cl.
CPC .............. *G01J 5/004* (2013.01); *B22D 2/006* (2013.01); *B22D 41/18* (2013.01); *F27D 21/0014* (2013.01); *G01J 5/042* (2013.01); *G01J 5/043* (2013.01); *G01J 5/0887* (2013.01); *G01J 5/0893* (2013.01); *F16B 7/20* (2013.01)

(58) Field of Classification Search
CPC .... B22D 2/003; B22D 11/181; B22D 11/186; B22D 11/205
USPC ........................................................ 374/125
See application file for complete search history.

(56) References Cited

U.S. PATENT DOCUMENTS

| 2,232,594 | A | | 2/1941 | Dike | |
|---|---|---|---|---|---|
| 3,935,032 | A | * | 1/1976 | Brandeberry | ............ G01K 1/08 136/230 |

(Continued)

FOREIGN PATENT DOCUMENTS

| DE | 19707373 C1 | 2/1998 |
|---|---|---|
| DE | 102007037684 A1 | 8/2008 |

(Continued)

*Primary Examiner* — Yaritza Guadalupe
(74) *Attorney, Agent, or Firm* — Thomas Clinton; Donald M. Satina

(57) ABSTRACT

A device for measuring the temperature of a bath of metal contains a sleeve and an optical head. The sleeve and optical head may be joined together or taken apart by rotation with respect to each other. The sleeve is made at least partially of a refractory material. A method for measuring the temperature of a bath of molten metal makes use of the inventive device. By virtue of this device, mounting and removal is rendered easier while keeping the measuring zone centered and decreasing measurement disturbances caused by the emission of gas from the sleeve.

15 Claims, 5 Drawing Sheets

(51) Int. Cl.
*G01J 5/04* (2006.01)
*F16B 7/20* (2006.01)

(56) References Cited

U.S. PATENT DOCUMENTS

| | | | |
|---|---|---|---|
| 4,038,105 A * | 7/1977 | Brandeberry | G01K 1/12 136/231 |
| 5,421,652 A * | 6/1995 | Kast | F01D 21/003 356/44 |
| 5,507,576 A * | 4/1996 | Fally | G01J 5/60 356/45 |
| 6,126,359 A | 10/2000 | Dittrich et al. | |
| 6,698,920 B1 * | 3/2004 | Maylotte | G01J 5/0022 356/73 |
| 6,733,173 B1 * | 5/2004 | Huston | F23N 5/082 374/121 |
| 7,776,254 B2 | 8/2010 | Knevels | |
| 8,220,346 B2 | 7/2012 | Arzberger | |
| 2004/0240518 A1 * | 12/2004 | Memoli | G01J 5/0044 374/139 |
| 2006/0171442 A1 * | 8/2006 | Volf | G01J 5/0003 374/1 |
| 2006/0215729 A1 * | 9/2006 | Wuester | G01K 1/08 374/141 |
| 2016/0327434 A1 * | 11/2016 | Dussud | B22D 41/18 |

FOREIGN PATENT DOCUMENTS

| | | |
|---|---|---|
| EP | 1298423 A1 | 4/2003 |
| EP | 2100974 A2 | 9/2009 |
| GB | 190928010 A | 10/1910 |
| GB | 2232594 | 12/1990 |
| WO | 03029771 A2 | 4/2003 |
| WO | 2005059185 A1 | 6/2005 |
| WO | 2006/130941 A1 | 12/2006 |

* cited by examiner

OPTICAL PYROMETER

BACKGROUND OF THE INVENTION a) Field of the Invention

The present invention is in the field of continuous temperature measurement. In particular, the present invention relates to the continuous temperature measurement of molten metal during the continuous casting thereof. Specifically, it is critical to control this temperature in order to ensure optimum quality of the cast metal.

b) Description of the Related Art

To this end, a device comprising a sleeve made of refractory material dipped into the bath of molten metal and coupled to temperature sensors is very widespread. Use is mainly made of two types of sensors, namely sensors that use type B thermocouples or thermocouples made of an alloy of noble metals, and infrared optical sensors. The drawback with the former is their premature ageing due to the extreme use conditions. Frequent replacement of the sensors has to be carried out, and this represents a non-negligible cost. Infrared optical sensors, also known as optical pyrometers, have, in contrast to thermocouples, a much longer service life while providing temperature measurements that are precise and stable over time as long as the measuring zone remains centred in the interior of the sleeve.

The International Application WO-A2-03/029771 discloses an assembly of an optical pyrometer and a sleeve made of refractory material which is dipped into a bath of molten metal in order to measure the temperature thereof. The pyrometer and the protective sleeve are secured so as to keep the measuring zone centred in the interior of the sleeve in spite of the impacts and vibrations to which the assembly can be subjected. A significant problem encountered in the use of such a device is the emission of gaseous components by the refractory material which, by condensing on the optical lens, can disturb the measurement. By judiciously selecting the composition of the refractory material and also controlling the atmosphere in the interior of the refractory tube, the influence of these gaseous components can be decreased. Another solution, proposed in the Patent Application WO-A2-03/029771, is the use of a second tube made of refractory material, which is impermeable to gases and is disposed in the interior of the cavity in the sleeve. The increased cost of this latter solution associated with a more complex device can easily be imagined, given that the thickness of the tube must not be greater than 5 mm in order to avoid an increase in the response time of the measuring system, and that the tube has to be positioned as close as possible to the cavity in the sleeve. However, the application does not give details with regard to the fixing means to be employed. The Patent EP-B1-1893959 likewise discloses a measuring device that uses an optical pyrometer comprising a sleeve made of refractory material that is dipped into the molten metal. This sleeve is centred by way of a guide tube and is supported on a fixed seat by way of articulated locking rods that are provided with wing nuts. The device then has to be placed in a cooled enclosure. The disadvantages of this device are numerous: specifically it requires that the sleeve made of refractory material is supported during the tightening of the nuts. Likewise, during the replacement of the sleeve, which takes place after a period of 15 to 24 hours of use—at the same time that the tundish is replaced—, it is not enough to loosen the wing nuts in order to pivot the rods so as to release the sleeve. Specifically, it is necessary to lift the sleeve beforehand from the seat on which it rests. Handling the hot refractory material is dangerous for the operator. In addition, a system of rods and wing nuts risks seizing given the extreme temperature conditions and the corrosive atmosphere. Finally, centring the measuring zone is also dependent on the positioning of the sleeve. The sleeve is centred by the guide tube of the measuring head which slides through the internal cavity of the sleeve and also by the positioning of the sleeve on the seat. The positioning thus depends on the external dimensions of the sleeve and the tolerances during its manufacture. Thus, when it is replaced, the measuring zone may move, with the consequence of less precise measurement.

BRIEF SUMMARY OF THE INVENTION

The object of the present invention is to remedy these drawbacks (difficulty of assembly, disassembling, keeping the measuring zone centred, disturbance of the measurement by the emission of gaseous components from the sleeve made of refractory material). To this end, the subject of the invention is a device for measuring the temperature of a bath of molten metal, comprising:

a) a sleeve (8) made at least partially of refractory material and having:
- an open end provided with at least one notch (14),
- a closed end,
- a longitudinal axis,
- a main internal bore (17) extending from the open end to the closed end along the longitudinal axis of the sleeve,
- an inlet portion (18) of the internal bore (17) that is spaced apart from the open end of the sleeve (8),
- the bore having grooves (15) disposed along the lengthwise direction of the inlet portion (18), the grooves (15) being angularly offset from said at least one notch (14) in the open end,
- the grooves (15) being designed or configured to guide the pins (7) of a head of a bayonet rod (4) into a blocking portion (16) of the internal bore that has a cross section larger than the smallest cross section of the internal bore (17) and a sufficient height to allow the relative rotation of the pins (7) of the bayonet rod (4) with respect to the sleeve about the longitudinal axis of the sleeve, and b) an optical head comprising:
a hollow bayonet rod (4) having an end provided with pins (7) and another end which accommodates a lens holder (3) closed off by a protective window (12) and a pyrometer lens (2), the intermediate part of the bayonet rod (4) being disposed in the centre of a spring (11) supported by a locking component (6) which:
- is free to rotate about the bayonet rod (4),
- is secured to a spring tensioner (9), also described as means (9) for tensioning the spring (11),
- is secured to a locking component rotator, also described as means for rotating about the bayonet rod (4), and
- has at least one peg (21) intended or configured to be accommodated in said at least one notch (14) in the sleeve (8),
- the locking component (6) pivoting or configured to be pivoted:
  - from a starting position in which the peg (21) of the locking component is in line with the notch (14) in the sleeve (8) and the pins (7) of the bayonet rod (4) are in line with the grooves (15),
  - to a position angularly offset from the starting position, in which the pins (7) of the bayonet rod (4) are in the blocking portion (16) of the internal bore, in a position offset from the grooves (15).

Thus, by joining the optical head to the sleeve (8), first fixing and immediate centring is effected by a relative rotational movement of the sleeve with respect to the optical head. A single operator is enough. By carrying out a rotational movement of the sleeve along its longitudinal axis, the peg (21) of the locking component (6) is carried along by the rotation. In turn, the rotation of the locking component (6) carries along the spring tensioner or means for tensioning the spring—such as a lever (9) secured thereto—visually indicating to the operator that fixing has been effected. In a second step, the operator partially releases the tension in the spring (11) by way of the lever (9). Flexibility in the fixing is thus produced by the control of the clamping force which changes during heating. Specifically, as a result of heating, additional tensions arise on account of the different coefficients of expansion of the refractory material and the metal. The presence of a spring affords a certain flexibility which is much greater than the extremely rigid system from the Patent EP-B1-1893959.

Another non-negligible advantage of the device is that it can be disassembled rapidly at high temperature without the sleeve having to be handled. After a measuring period of 15 to 24 hours, it is conventional to replace the sleeve during the replacement of the tundish. An effective way of proceeding is to disassemble the device above the tundish and to let the sleeve fall into the tundish needing to be replaced. The invention makes this step easy, quick and without danger for the operator. Specifically, all he has to do is lower the lever and then rotate the lever in order to disconnect the sleeve without having to touch it.

The invention also includes one or more features from the following list:

the number of pins (7) is one or more but there may be three pins (7) on the bayonet rod (4), thereby ensuring that the sleeve (8) is held optimally. The minimum number of grooves is one.

lateral channels (13) in the wall of the lens are configured to holder allow the passage of a gas (for example argon), which sweeps under the protective window (12), preventing any gas emitted by the refractory material or dust from disturbing the optical measurement by condensing on the protective window (12), a vent tube (25) is connected to the end of the bayonet rod (4) so as to improve the evacuation of fumes emitted by the sleeve. The gas coming from the lateral channels (13) in the wall of the lens holder continues to travel as far as the end of the tube and then rises through the grooves (15) and the notch (14), carrying along the dust and fumes from the sleeve. The connection can be made by screwing or interlocking. The vent tube may also be in one piece with the bayonet rod (4).

the inlet portion (18) of the internal bore that is spaced apart from the upper end of the sleeve consists of a metal insert having a bore positioned coaxially with the longitudinal axis of the sleeve. Another alternative is to produce the sleeve without a metal insert.

a ring (19) free to rotate about the bayonet rod (4) and secured to the locking component (6) is placed above the spring so as to improve the smoothness of movement of the cam lever. The cam could effectively bear directly on the spring.

the bore in the inlet portion (18) is frustoconical and the locking component (6) has a conical end. Interlocking of the optical head with the sleeve is thus made easier.

the spring tensioner or means for tensioning the spring is a cam lever, which is a rapid and practical means for tensioning the spring. Tensioning can also be effected by a tightening system of the Enerpack type (hydraulic actuator) or a nut/bolt system.

The combination of these two last features allows optimal centring of the measuring zone. This centring is dependent only on the machining of the metal parts the manufacturing tolerances of which are low. In addition, all the tensions associated with the different coefficients of expansion of the refractory material and the metal elements are counterbalanced by the spring.

The grooves (15) designed or configured to guide the pins may also serve as passageways for the evacuation of gaseous components emitted by the sleeve made of refractory material when it is brought to high temperature. The quantity of gas and dust which reach the protective window (12) is thus reduced. As described above, the measuring window may also be swept by the injection of a gas, such as argon, which prevents any disturbance of the measurement by the deposition of condensation on the protective window. The installation of a vent tube provides an additional improvement to the process. FIG. 6 shows a device with a vent tube (25).

Further subjects of the invention are a sleeve made at least partially of refractory material as described above and a method for assembling together, and disassembling a sleeve and an optical head according to the invention. The advantages are greater ease of use and increased safety, as explained above.

BRIEF DESCRIPTION OF THE SEVERAL VIEWS OF THE DRAWING(S)

DETAILED DESCRIPTION OF THE INVENTION

Figures 1A, 1B:
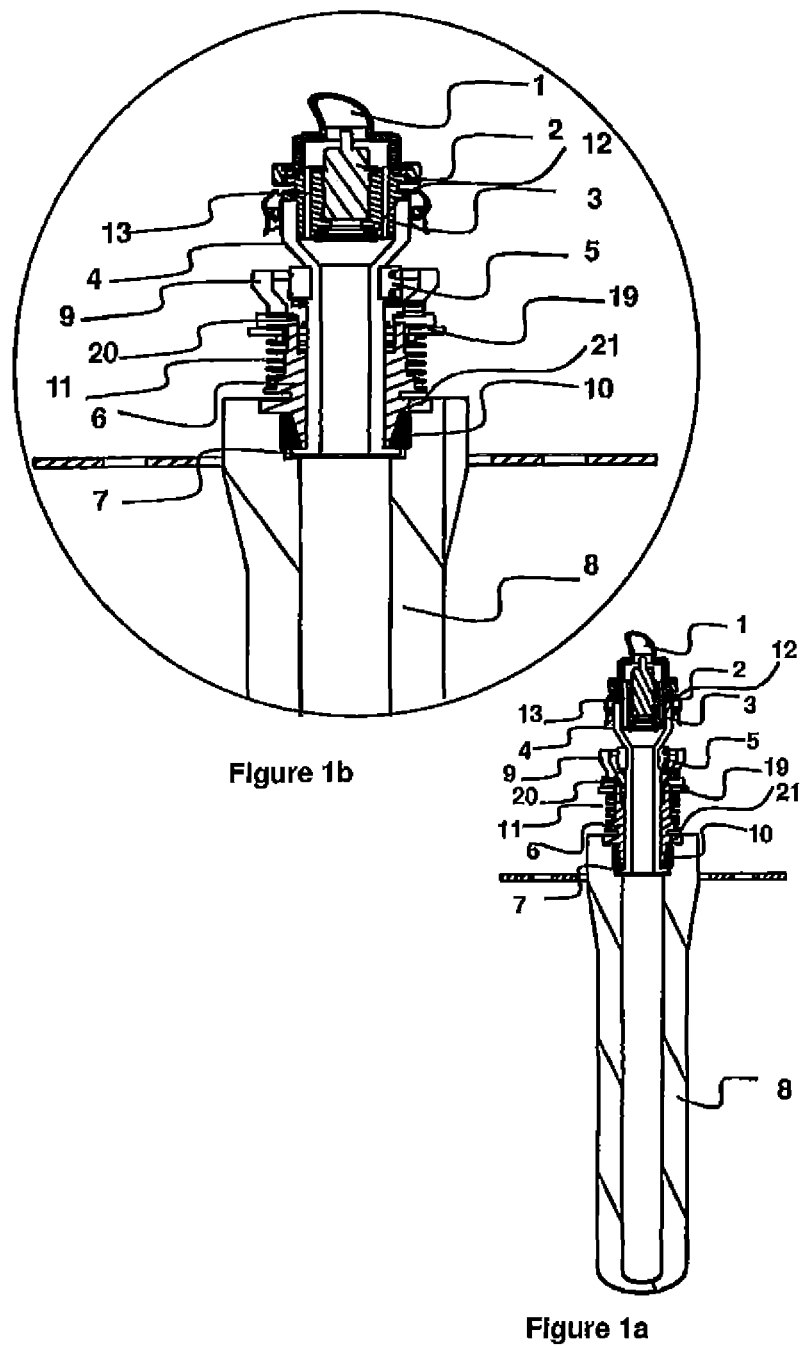
FIG. 1a is a cross section view, in a vertical plane, of a device according to the present invention.
FIG. 1b is a cross section view, in a vertical plane, of a portion of a device according to the present invention.

FIGS. 1a, 1b show a measuring device according to one particular embodiment of the invention, FIG. 1b being an enlargement of the upper region of FIG. 1a. Said figures show a device comprising:

a lens (2) of the pyrometer, disposed in a lens holder (3) cooled by the passage of gas through the lateral channels (13) in the wall of the lens holder (3). The lateral channels (13) carry this gas under the protective window (12) and ensure constant sweeping, preventing any gas or dust from condensing on the protective window (12).

a hollow bayonet rod (4) which has an end provided with two pins (7) and another end accommodating the lens holder (3) and the pyrometer lens (2). The intermediate part is disposed in the centre of a spring (11) supported by a locking cone (6) that is free to rotate about the bayonet rod (4), the spring (11) being held between the locking cone (6) and a ring (19) secured to the bayonet rod (4), the locking cone (6) having:
1. in its upper part, two opposite protuberances (20) that are parallel to the axis of the bayonet rod (4) and fixed with the aid of nuts to a double cam lever (9),
2. in its lower part, two opposite pegs (21) that are intended or configured to be accommodated in the notches (14) in the sleeve (8), the locking cone (6) pivoting, or configured to be pivoted:
   from a starting position in which the pegs (21) of the locking cone are in line with the notches (14) in the sleeve (8) and the pins (7) of the bayonet rod (4) are in line with the grooves (15),
   to a position angularly offset from the starting position, in which the pins (7) of the bayonet rod (4) are in the blocking portion (16) in a position offset from the grooves (15).
3. in its intermediate part, a lip that holds the spring (11).
a double cam lever (9), secured to the locking cone (6) via the protuberances (20) of the cone, bearing against the ring (19). By pivoting the lever upwards, the locking cone (6) is lowered and releases the compression of the spring (11), which may be made of inconel in order to withstand the high use temperatures.
a sleeve (8) made at least partially of refractory material, the composition of which is selected so as to reduce the production of gas at high temperatures. It may be made at least partially of alumina-graphite.
a metal insert (10) accommodated in the upper part of the sleeve (8) and delimiting an inlet such as a frustoconical inlet for receiving the lower end of the bayonet rod (4).

Figure 2:
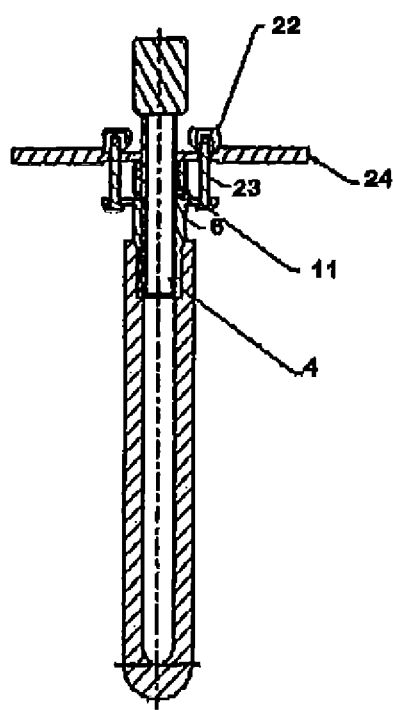
FIG. 2 is a cross section view, in a vertical plane, of a device according to the present invention.

In the embodiment described above, the spring tensioner, also described as the tensioning means, and the locking component rotator, also described as means for rotating about the bayonet rod (4), are one and the same: the double cam lever (9) is used to turn the locking cone (6). FIG. 2 shows another embodiment: a nut (22)/bolt (23) system which is used for tensioning and is connected to two handles (24) for turning the locking cone (6).

Figure 4:
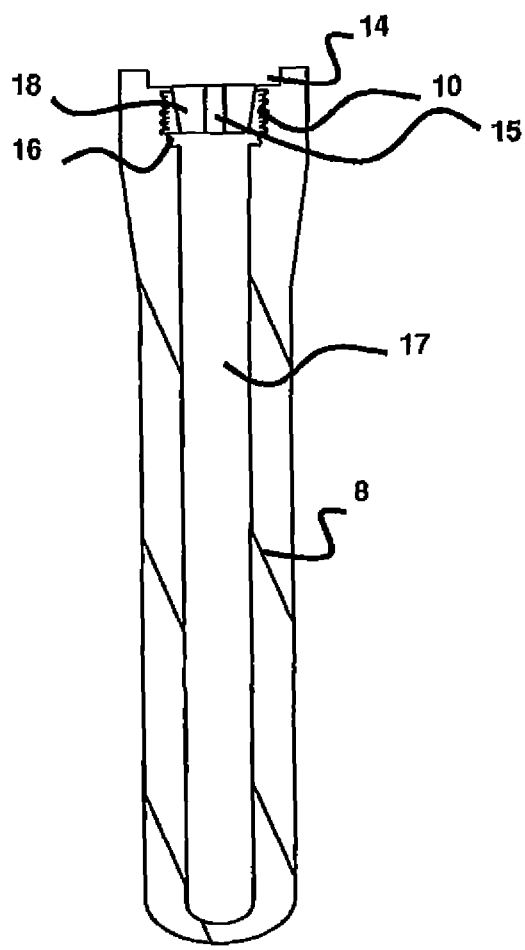
FIG. 4 is a cross section view, in a vertical plane, of a device according to the present invention.
Figure 3:
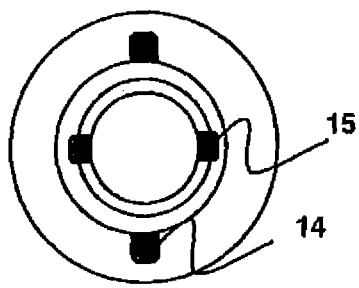
FIG. 3 is a cross section view, in a horizontal plane, of a device according to the present invention.

In FIG. 3, which shows the cross section through the sleeve on a horizontal plane, and in FIG. 4, which shows a cross section through the sleeve (8) on a vertical plane, two grooves (15) that pass vertically through the metal insert can be seen. In this way, these grooves allow the two pins (7) of the bayonet rod (4) to pass in. The pins (7) arrive under the metal insert (10), in the blocking portion (16) of the internal bore that has a cross section larger than the smallest cross section of the internal bore (17) and a sufficient height to allow the rotation of the pins (7) of the bayonet rod (4). The pins (7) can thus be rotated through a quarter turn, thereby fixing the bayonet rod (4).

The grooves (15) are also used for evacuating gases emitted by the refractory material. The evacuation of the gases can be improved by creating a negative pressure in the sleeve (8) by way of a Venturi system for example. The gases will then be sucked out towards the outlet.

Figure 5:
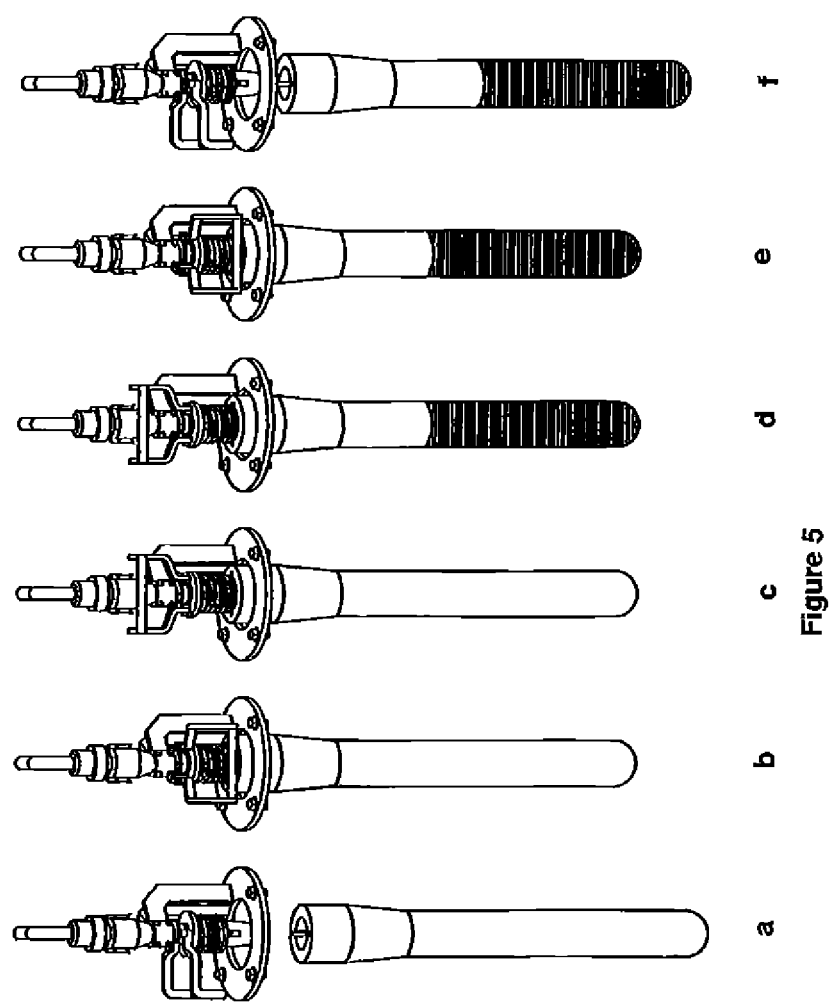
FIG. 5 is a series of perspective views of the sequence of mounting and removing the sleeve of a device according to the present invention.

FIG. 5 shows the sequence of mounting and removing the sleeve (8) (a to f): the operator inserts the sleeve (8) by bringing the pegs (21) of the locking cone (6) into correspondence with the notches (14) in the upper part of the sleeve (8), position (a). Then, the pins (7) of the bayonet rod (4), which are offset through a quarter turn with respect to the pegs (21) of the locking cone, pass into the grooves (15) in the metal insert. When the pegs (21) of the locking cone (6) are in the notches (14), the pins (7) of the bayonet rod (4) have passed beyond the metal insert and pass into the blocking portion (16) of the internal bore that has a cross section larger than the smallest cross section of the internal bore (17).

By turning through a quarter turn (position b), the fixing of the bayonet rod (4) takes effect, and the operator can then release the sleeve (8). This rotational movement causes the locking cone (6) and thus the lever (9) to rotate through a quarter turn via the pegs (21) of the locking cone.

The operator then vertically raises this lever (position c), thereby lowering the locking cone (6), which bears against the metal insert. By raising the lever, the spring (11) is partially relaxed, and is thus more flexible and can counter additional tensions which arise on account of the different coefficients of expansion of the refractory material and the metal.

The measuring device is ready to be used. It then suffices to move the assembly above a tundish.

Position (d) shows the device in operation, and the bottom of the sleeve (8) is hot.

When it is subsequently necessary to replace the sleeve (8) made of refractory material, all that is required is to carry out the opposite movements of the lever (9). That is to say, lower the lever (position e) and then carry out a quarter turn (position f), thereby releasing the protective sleeve (8) into the tundish.

A further subject of the invention is a method for measuring the temperature of a bath of molten metal, comprising the following steps of:
providing a sleeve and an optical head as previously described:
assembling the sleeve and the optical head by rotation of the sleeve, causing the rotation of the spring tensioner of the optical head, also described as the means for tensioning the spring of the optical head,
decompressing the spring to form an assembly of the sleeve and optical head into a measuring device as previously described,
positioning the assembly in the bath of molten metal, and measuring the temperature.

The sleeve may be configured so that a single notch (14) is provided. The sleeve may consist of refractory material, consist essentially of refractory material, or be made only of refractory material. The bore in the inlet portion (18) spaced apart from the end of the sleeve may be frustoconical.

It should be noted that the method for assembling the sleeve on the optical head can be applied to the assembling of a stopper rod on a fixing rod.

The stopper rod thus has the following features:
an open end provided with at least one notch,
a closed end,
a longitudinal axis,
a main internal bore extending from the open end to the closed end along the longitudinal axis of the stopper rod,
an inlet portion of the internal bore that is spaced apart from the open end of the stopper rod,
the bore having grooves disposed along the lengthwise direction of the inlet portion; the grooves being angularly offset from said at least one notch in the open end,
the grooves being designed or configured to guide the pins, of which there are three in certain embodiments, of a head of a bayonet rod into a portion for blocking the internal bore that has a cross section larger than the smallest cross section of the internal bore and a sufficient height to allow the rotation of the pins of the bayonet rod with respect to the stopper rod about the longitudinal axis of the stopper rod.

Such a stopper rod can be used with a system for fixing the device described above, wherein the elements intended or configured to measure the temperature can optionally have been omitted.

Figure 6:
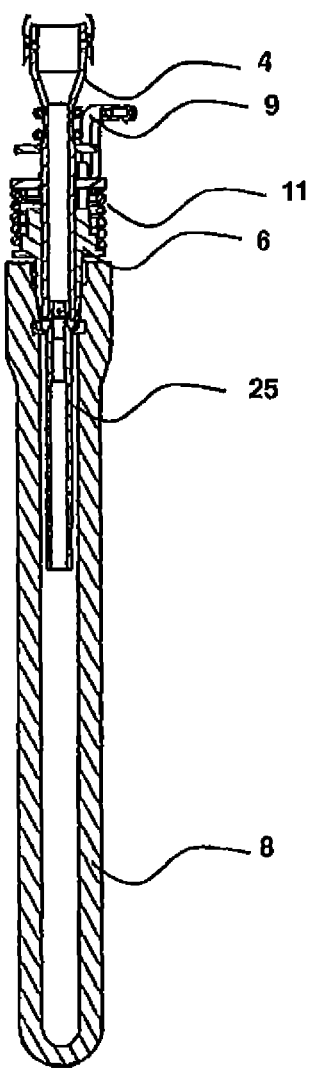
FIG. 6 is a cross section view, in a vertical plane, of a device according to the present invention.

FIG. 6 shows a device according to claim 6. The vent tube is interlocked with the bayonet rod (4) and held with the aid of a screw. The cavity of the vent tube is flared in its lower part so as to avoid the situation in which a slight misalignment of the vent tube prevents the range of the pyrometer from reaching the bottom of the sleeve.

Numerous modifications and variations of the present invention are possible. It is, therefore, to be understood that within the scope of the following claims, the invention may be practiced otherwise than as specifically described.

LIST OF REFERENCES

1. Inlet of the optical fibre and the measuring cables
2. Lens of the pyrometer
3. Lens holder
4. bayonet rod
5. Support bracket
6. Locking cone
7. Pins of the bayonet rod
8. Protective sleeve
9. Lever
10. Metal insert
11. Spring
12. Protective window
13. Gas inlet channel
14. Notches
15. Grooves
16. blocking portion of the internal bore
17. Main internal bore
18. Inlet portion of the internal bore (17) that is spaced apart from the open end of the sleeve (8)
19. Ring
20. Protuberance of the locking cone
21. Peg of the locking cone
22. Nut
23. Bolt
24. Handle
25. Vent tube

What is claimed is:

1. Device for measuring the temperature of a bath of molten metal, comprising:
   a) a sleeve made at least partially of refractory material and having:
      an open end provided with at least one notch,
      a closed end,
      a longitudinal axis,
      a main internal bore extending from the open end to the closed end along the longitudinal axis of the sleeve,
      an inlet portion of the internal bore that is spaced apart from the open end of the sleeve,
      wherein the bore has grooves disposed along the lengthwise direction of the inlet portion, wherein the grooves are angularly offset from said at least one notch in the open end, and
      wherein the grooves are configured to guide pins of a head of a bayonet rod into a blocking portion of the internal bore that has a cross section larger than the smallest cross section of the internal bore and a sufficient height to allow the relative rotation of the pins of the bayonet rod with respect to the sleeve about the longitudinal axis of the sleeve, and
   b) an optical head comprising:
      a hollow bayonet rod having an end provided with pins, and another end which accommodates a lens holder closed off by a protective window and a pyrometer lens, the intermediate part of the bayonet rod being disposed in the center of a spring supported by a locking component which:
         is free to rotate about the bayonet rod,
         is secured to a spring tensioner,
         is secured to a locking component rotator, and
         has at least one peg configured to be accommodated in said at least one notch in the sleeve,
      the locking component configured to be pivoted:
         from a starting position in which the peg of the locking component is in line with the notch in the sleeve and the pins of the bayonet rod are in line with the grooves,
         to a position angularly offset from the starting position, in which the pins of the bayonet rod are in the blocking portion of the internal bore in a position offset from the grooves.

2. Device according to claim 1, wherein the lens holder has a wall comprising lateral channels configured to allow the passage of a gas that cools the lens of the pyrometer and sweeps across the protective window.

3. Device according to claim 1, wherein the bore in the inlet portion spaced apart from the end of said sleeve is frustoconical.

4. Device according to claim 1, wherein the end of the locking component is conical.

5. Device according to claim 1, wherein the spring tensioner and the locking component rotator is a lever.

6. Device according to claim 1, wherein a vent tube is interlocked with the bayonet rod.

7. Sleeve made at least partially of refractory material and configured to be accommodated in a device according to claim 1, having:
   an open end provided with at least one notch, configured to accommodate a peg of an optical head,
   a closed end,
   a longitudinal axis,
   a main internal bore extending from the open end to the closed end along the longitudinal axis of the sleeve,
   an inlet portion of the internal bore that is spaced apart from the open end of the sleeve,
   the bore having grooves disposed along the lengthwise direction of the inlet portion, wherein the grooves are angularly offset from said at least one notch in the open end,
   the grooves being configured to guide the pins of a head of a bayonet rod into a blocking portion of the internal bore that has a cross section larger than the smallest cross section of the internal bore and a sufficient height to allow the relative rotation of the pins of the bayonet rod with respect to the sleeve about the longitudinal axis of the sleeve.

8. Sleeve according to claim 7 made at least partially of a refractory material, wherein a single notch is provided.

9. Sleeve according to claim 7, comprising a refractory material.

10. Sleeve according to the claim 7, wherein the bore in the inlet portion spaced apart from the end of said sleeve is frustoconical.

11. Stopper rod comprising a sleeve according to claim 7.

12. Method for assembling a temperature-measuring device according to claim 1, the method comprising the following steps of:
   providing an optical head and a sleeve, fitting the optical head into the sleeve,
fixing the sleeve by rotation thereof, causing the rotation of the spring tensioner of the optical head, and
decompressing the spring.

13. Method for disassembling a sleeve from an optical head of a temperature-measuring device according to claim 1, the method comprising the following steps of
compressing the spring,
pivoting the spring tensioner so as to return to the initial position of the spring tensioner, causing the disconnection of the sleeve,
disengaging the sleeve.

14. Method for measuring the temperature of a bath of molten metal with a temperature-measuring device according to claim 1, comprising the following steps of:
providing an optical head,
providing a sleeve,
assembling the sleeve to the optical head to produce a temperature-measuring device according to claim 1 by rotating the sleeve with respect to the optical head, causing the rotation of the spring tensioner of the optical head,
decompressing the spring,
positioning the assembly in the bath of molten metal,
measuring the temperature.

15. Device according to claim 1, wherein the spring tensioner and the rotatable bayonet housing is a cam lever.

* * * * *